United States Patent
Gehman et al.

(10) Patent No.: US 6,260,093 B1
(45) Date of Patent: Jul. 10, 2001

(54) METHOD AND APPARATUS FOR ARBITRATING ACCESS TO MULTIPLE BUSES IN A DATA PROCESSING SYSTEM

(75) Inventors: Judy M. Gehman; Curtis R. Settles, both of Fort Collins, CO (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/052,853

(22) Filed: Mar. 31, 1998

(51) Int. Cl.⁷ .......................... G06F 13/14; G06F 13/362
(52) U.S. Cl. ........................ 710/129; 710/128; 710/113
(58) Field of Search .................... 710/126–130, 710/107–125

(56) References Cited

U.S. PATENT DOCUMENTS

| | | | |
|---|---|---|---|
| 4,373,183 | 2/1983 | Means et al. | 364/200 |
| 4,641,237 | 2/1987 | Yabushita et al. | 364/200 |
| 4,930,102 | 5/1990 | Jennings | 364/900 |
| 5,301,333 | 4/1994 | Lee | 395/725 |
| 5,353,415 | 10/1994 | Wolford et al. | 395/325 |
| 5,396,602 | 3/1995 | Amini et al. | 395/325 |
| 5,420,985 | 5/1995 | Cantrell et al. | 395/325 |
| 5,463,740 | 10/1995 | Taniai et al. | 395/299 |
| 5,511,165 | 4/1996 | Brady et al. | 395/200.01 |
| 5,546,546 | 8/1996 | Bell et al. | 395/292 |
| 5,555,383 * | 9/1996 | Elazar et al. | 710/126 |
| 5,619,661 | 4/1997 | Crews et al. | 395/299 |
| 5,621,900 * | 4/1997 | Lane et al. | 710/120 |
| 5,632,021 * | 5/1997 | Jennings et al. | 710/129 |
| 5,708,794 * | 1/1998 | Parks et al. | 711/154 |
| 5,717,873 * | 2/1998 | Rabe et al. | 710/110 |
| 5,734,850 * | 3/1998 | Kenny et al. | 710/129 |
| 5,737,545 * | 4/1998 | Wszolek et al. | 710/108 |
| 5,740,376 * | 4/1998 | Carson et al. | 710/101 |
| 5,748,918 * | 5/1998 | Cho et al. | 710/126 |
| 5,761,454 * | 6/1998 | Adusmilli et al. | 710/126 |
| 5,835,738 * | 11/1998 | Blackledge, Jr. et al. | 710/127 |
| 5,838,932 * | 11/1998 | Alzien | 710/128 |
| 5,838,935 * | 11/1998 | Davis et al. | 710/129 |
| 5,857,084 * | 1/1999 | Klein | 395/309 |
| 5,864,688 * | 1/1999 | Santos et al. | 395/309 |
| 5,884,027 * | 3/1999 | Garbus et al. | 709/250 |

FOREIGN PATENT DOCUMENTS

| | | |
|---|---|---|
| 0 391 537 | 10/1990 | (EP) . |
| 0 654 743 A1 | 5/1995 | (EP) . |
| 0 814 468 A2 | 12/1997 | (EP) . |

OTHER PUBLICATIONS

PCI System Architecture, Third Edition, Tom Shanlley/Don Anderson, 1995, pp. 381–387.*

* cited by examiner

Primary Examiner—Sumati Lefkowitz
(74) Attorney, Agent, or Firm—Carstens, Yee & Cahoon, L.L.P.

(57) ABSTRACT

A method and apparatus in a data processing system for multiple bus arbitration, wherein the data processing system includes a first bus connected to a second bus by a bridge. In response to receiving a request for a target device from a master device connected to a first bus, a determination is made as to whether the target device is connected to the first bus. The bridge is selected in response to determining that the target device is located on the second bus. The bridge initiates a request for the second bus in response to the selection of the bridge. The first bus and the second bus are connected to each other by the bridge in response to the bridge receiving a grant to the second bus, wherein the master device transfers data between the master device and the target device across the bridge. In response to the bridge being selected from a master device on both the first bus and the second bus, the bridge signals one master device to retract or withdraw the selection of the bridge, allowing the other master device to complete a data transfer.

32 Claims, 5 Drawing Sheets

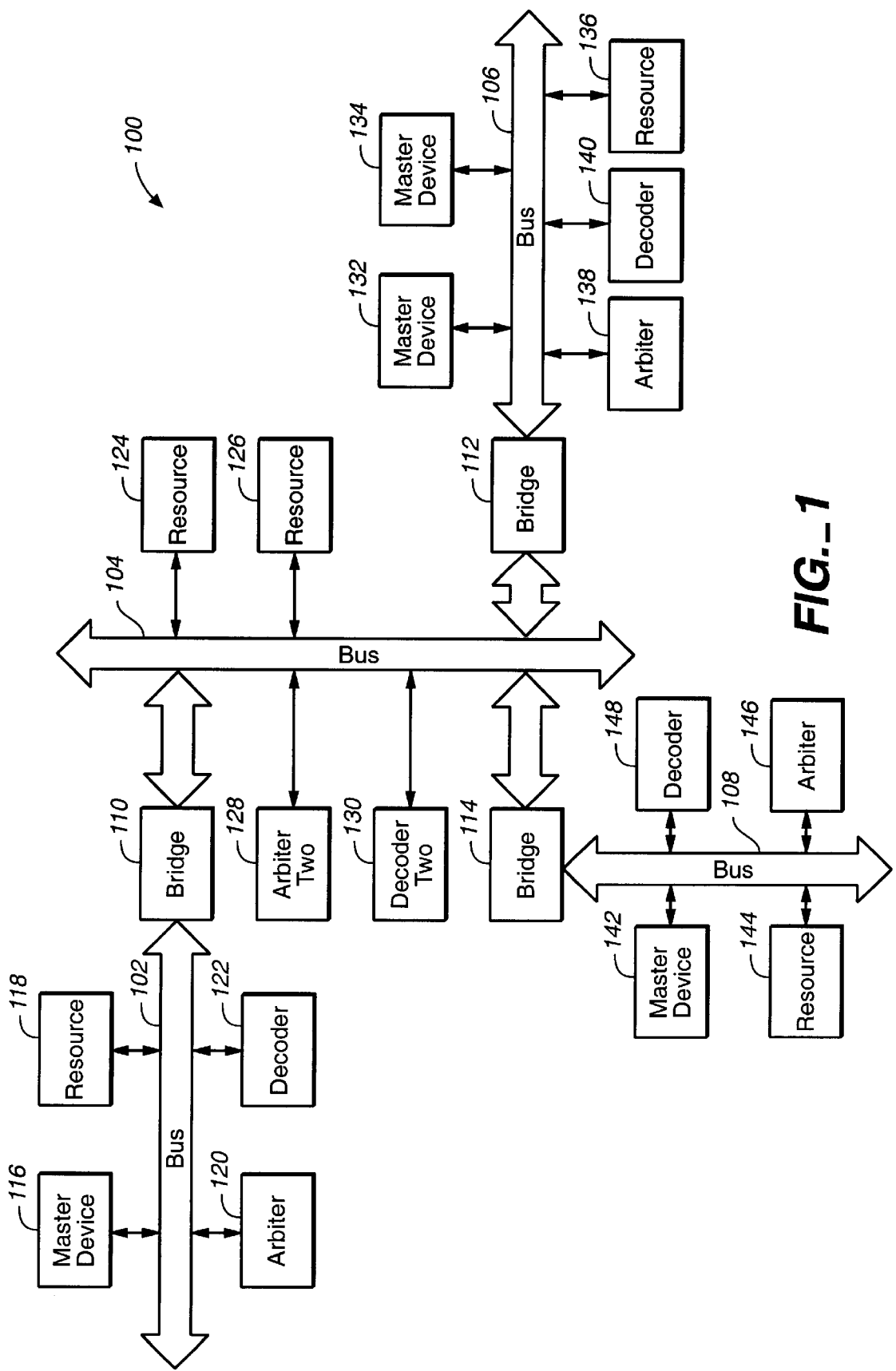
FIG._1

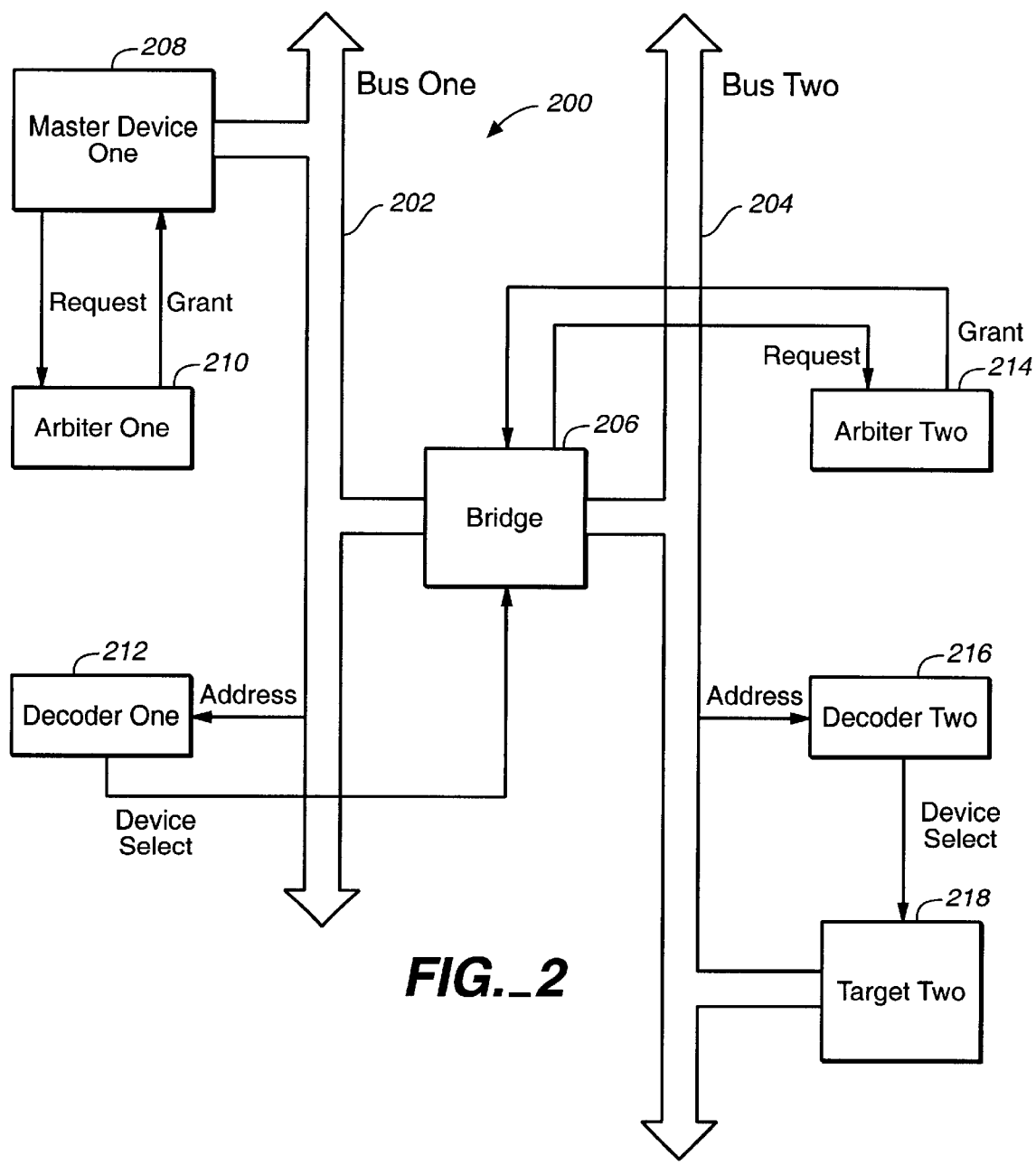
FIG._2

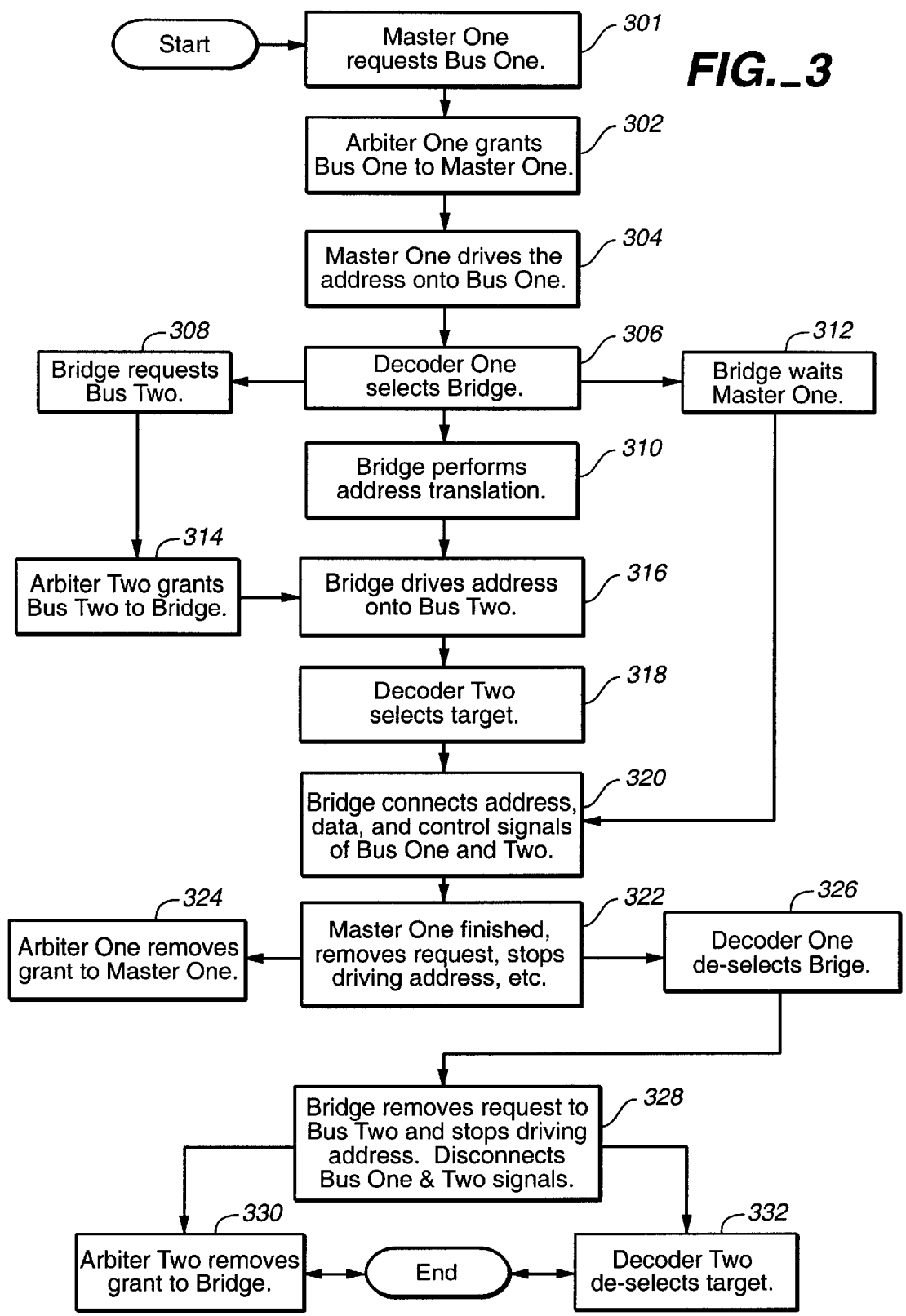
FIG._3

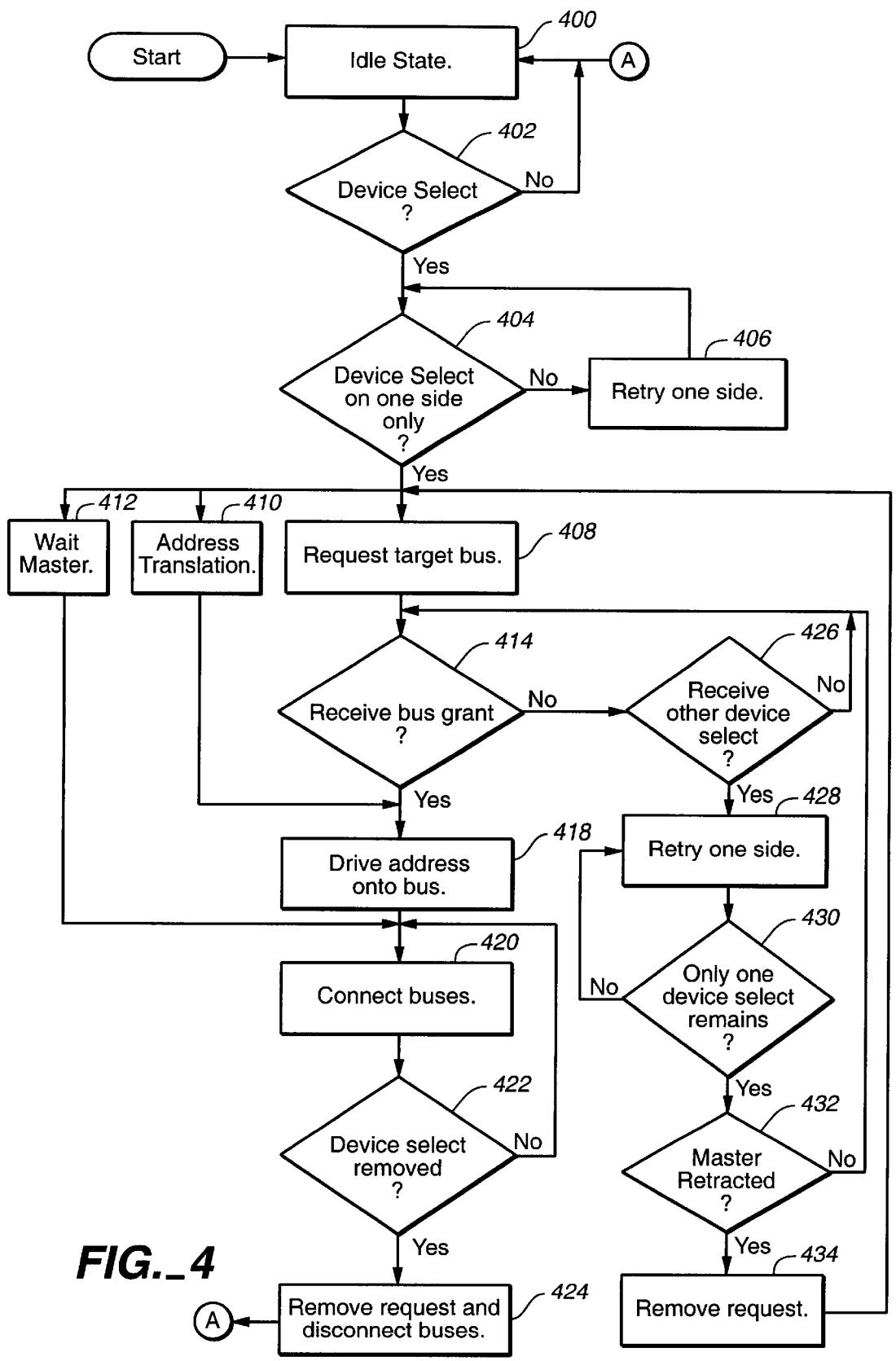
FIG._4

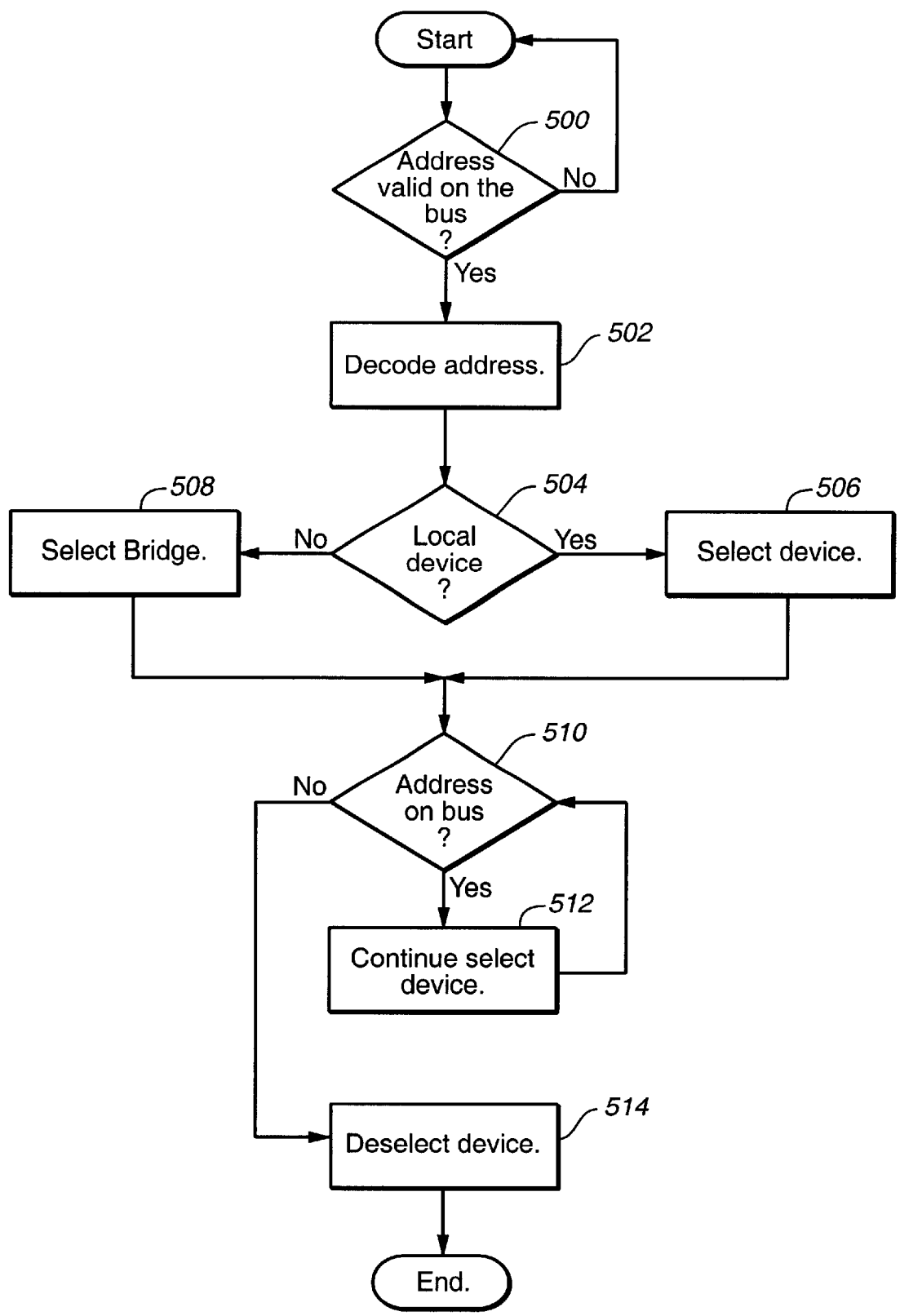
FIG._5

METHOD AND APPARATUS FOR ARBITRATING ACCESS TO MULTIPLE BUSES IN A DATA PROCESSING SYSTEM

BACKGROUND OF THE INVENTION

1. Technical Field

The present invention relates generally to an improved data processing system and in particular to a method and apparatus for arbitrating access to multiple buses in a data processing system. Still more particularly, the present invention relates to a method and apparatus for arbitrating access to multiple buses in a data processing system using a distributed arbitration mechanism.

2. Description of the Related Art

The performance demands on personal computers are ever increasing. It has been determined that a major bottleneck in improving performance is the capability to perform input/output (I/O) operations. Processor speeds continue to increase at a great rate and memory speeds and architectures can partially keep pace. However, the speed of I/O operations, such as disk and local area network (LAN) operations, has not kept pace. The increasing complexity of video graphics used in personal computers is also demanding greater performance than can be conventionally provided.

Some of the problems were in the bus architecture used in IBM PC-compatible computers. The EISA architecture provided some improvement over the ISA architecture of the IBM PC/AT, but more performance was still required. To this end Intel Corporation, primarily, developed the Peripheral Component Interconnect (PCI) bus. The PCI bus is a mezzanine bus between the host or local bus in the computer, to which the processor and memory are connected, and the I/O bus, such as ISA or EISA. For more details on the PCI bus, reference to the PCI Standard Version 2.0, from the PCI Special Interest Group in care of Intel Corp., which is hereby incorporated by reference, is advised. The bus was designed to have a high throughput and to take advantage of the increasing number of local processors that support I/O functions. For example, most disk controllers, particularly SCSI controllers, and network interface cards (NICs) include a local processor to relieve demands on the host processor. Similarly, video graphics boards often include intelligent graphics accelerators to allow a higher level function transfer. Typically these devices have the capability of operating as bus masters, to allow the devices to transfer data at the highest possible rates. Each of these devices also is referred to as a "node".

To effectively utilize a common bus system for the transfer of data and messages by various local processors connected to the bus some form of arbitration is required to determine which processor obtains access to the bus. A central arbiter may be coupled to each of the processors to determine which one will be granted access to the bus during any given bus cycle. Such a central arbiter receives separate bus requests from various nodes at times when those nodes are ready to obtain access to a bus to transmit a message or transfer data to another node. In response to a number of bus requests, the central arbiter sends a bus grant to only one of the requested nodes in a predetermined matter corresponding to a selected priority scheme.

In data processing systems containing multiple buses and multiple master devices, in which the master devices communicate with devices on other buses, a system of arbitration on multiple buses is required for high performance and reliability of avoiding deadlock situations in which master devices on different buses make requests for target devices or resources on opposite sides of the buses. Presently available arbitration systems include a complex hierarchical arbitration system that determines all possible deadlock situations up front in designing the system. In such an arbitration system, all of the deadlock situations are designed into a top level arbiter. This top level arbiter, directed lower level arbiters on the bus level to avoid deadlock. The drawback of such an arbitration system is that is a potential deadlock condition was missed, the chip could lock up. Therefore, an improved method and apparatus for bus arbitration that avoids deadlock situations for multiple bus data processing systems is desirable.

SUMMARY OF THE INVENTION

The present invention provides a method and apparatus in a data processing system for multiple bus arbitration, wherein the data processing system includes a first bus connected to a second bus by a bridge. In response to receiving a request for a target device from a master device connected to a first bus, a determination is made as to whether the target device is connected to the first bus. The bridge is selected in response to determining that the target device is located on the second bus. The bridge initiates a request for the second bus in response to the selection of the bridge. The first bus and the second bus are connected to each other by the bridge in response to the bridge receiving a grant to the second bus, wherein the master device transfers data between the master device and the target device across the bridge. In response to the bridge being selected from a master device on both the first bus and the second bus, the bridge signals one master device to retract or withdraw the selection of the bridge, allowing the other master device to complete a data transfer.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 1 is a block diagram of a data processing system in the present invention may be implemented;

FIG. 2 is a block diagram of data flow in a data transaction between a master device on a first bus and a target device on a second bus in a data processing system in accordance with a preferred embodiment of the present invention;

FIG. 3 is a flowchart illustrating transactions between a master device on a bus that read/writes data to a target on a different bus in accordance with a preferred embodiment of the present invention;

FIG. 4 is a flowchart of a process employed by a bridge during arbitration for access to a bus in accordance with a preferred embodiment of the present invention; and FIG. 5 is a flowchart of a process implemented in a decoder in accordance with a preferred embodiment of the present invention.

DETAILED DESCRIPTION

With reference now to the figures, and in particular with reference to FIG. 1, a block diagram of a data processing system 100 in which the present invention may be implemented is illustrated. In particular, the present invention implements within data processing system 100 a single level arbiter and bridge system for arbiting requests across buses. Data processing system 100 employs an advanced system bus (ASB), which is part of the Advanced Microcontroller Bus Architecture (AMBA) from Advanced RISC Machines, Ltd.(ARM). The bus is described in the AMBA specification, which is available from ARM located in Cambridge, England. Although the depicted example employs an ASB of the AMBA specification, other bus architectures used for system on a chip buses may be used as well as other bus architectures such as peripheral component interconnect (PCI) local bus, Micro Channel, and ISA may be used. In the depicted example, data processing system 100 includes bus 102, bus 104, bus 106, and bus 108. Bus 102 and bus 104 are connected to each other through bridge 110, while bus 104 and bus 106 are connected to each other through bridge 112. Bus 108 is connected to bus 104 by bridge 114. Master device 116, resource 118, arbiter 120, and decoder 122, are connected to bus 102. Arbiter 120 arbitrates access to bus 102, while decoder 122 decodes address placed onto bus 102. Resource 124 and resource 126 are connected to bus 104. Additionally, arbiter 128 and decoder 130 are connected to bus 104. Arbiter 128 and decoder 130 provide abitration and decoding functions for bus 104. Master device 132, master device 134, and resource 136 are connected to bus 106. Arbiter 138 and decoder 140 are connected to bus 106 and provide arbitration and decoding functions for bus 106. Bus 108 has a master device 142 and a resource 144 connected to it. Arbiter 146 and decoder 148 provide arbitration and decoding functions for bus 108.

Those of ordinary skill in the art will appreciate that the hardware in FIG. 1 may vary. For example, other number of master devices and resources may be located within data processing system 100. These master devices may be adapters containing intelligent input/output processors. For example, a master device may be a graphics adapter or a Fibre channel adapter. The resources may include numerous types of devices, such as random access memories, read only memories, hard disk drives, or tape storage systems. Additionally, data processing system 100 may have only two or three buses or may have more than four buses. The depicted example is not meant to imply architectural limitations with respect to the present invention.

Within data processing system 100, master devices located on each of the buses are able to concurrently access resources on their individual buses. When a master device, such as master device 116, wants to access a resource located on a different bus, such as resource 126 on bus 104, the transaction must cross a bridge, such as bridge 110. Decoder 122 selects bridge 110, which causes bridge 110 to arbitrate for bus 104. When an acknowledgement is received, the bridge, bridge 110, acts as a master device on a second bus, such as bus 104, and as a resource on the first bus, such as bus 102, in accordance with a preferred embodiment of the present invention. Thus, in addition to connecting the buses to each other to move data, bridge 110 also acts like a master device or target device on both buses in accordance with a preferred embodiment of the present invention.

The address from master device 116 on bus 102 is passed on to decoder 130 on bus 104 through bridge 110 connecting two buses. Depending on whether both buses, bus 102 and bus 104, use the same address map, bridge 110 may or may not perform address translation before passing the address to bus 104.

On bus 104, decoder 130 selects either a device or another bridge depending on the address placed on the bus by the master device. If the address is for a device on the second bus, bus 104, decoder 130 on bus 104 will select that device. If the address is for the device on the third bus, bus 106, decoder 130 would select bridge 112. If the target device were located on bus 108, decoder 130 would select bridge 114. Assuming that bridge 112 is selected, the process repeats with the address being passed to a third bus decoder, decoder 140. In accordance with a preferred embodiment of the present invention, the arbiter on each bus treats a bridge request like any other request from a master device. The arbiter on a bus may use any appropriate type of arbitration for the bus. The type of arbitration on each bus may be independent from the other buses.

In accordance with a preferred embodiment of the present invention, each bridge is able to recognize when it is selected by decoders on each side of the bridge at the same time. When such a situation occurs, the bridge issues a retry signal to one of the masters on one bus and processes the select from the master on the other bus. The master issued the retry signal removes its request from the bus. In this manner that bus is freed up so that the transaction on the other bus may be completed, thus, avoiding deadlock. Depending on the priorities of the devices in the data processing system, the bridge may alternate which side is issued a retry signal or always have one side issued a retry signal.

With reference next to FIG. 2, a block diagram of data flow in a data transaction between a master on a first bus and a target device on a second bus in a data processing system is depicted in accordance with a preferred embodiment of the present invention. Data processing system 200 includes bus one 202 connected to bus two 204 by bridge 206. Master device one 208 sends a request for bus one 202 to arbiter one 210. A grant is sent back to master device one 208. In the depicted example, decoder one 212 decodes an address placed on bus one 202. Based on the address, decoder one 212 selects bridge 206, which in turn requests bus two 204 from arbiter two 214. When a grant is received by bridge 206 from arbiter two 214, bridge 206 places the address on bus two 204. Decoder two 216 decodes the address and selects target two device 218. At this time, master device one 208 has access to target two device 218 to perform data transfer. A more detailed description of the process followed by these devices are described with reference to FIG. 3.

Turning next to FIG. 3, a flowchart illustrating transactions between a master on a bus that read/writes data to a target on a different bus is illustrated in accordance with a preferred embodiment of the present invention. The process described in FIG. 3 is made with reference to the components illustrated in FIG. 2. The process begins with the master device requesting bus one (step 300). The master device sends a request to the arbiter on bus one. This arbiter can use any arbitration scheme, such as, for example, priority or round-robin. In this example, the master device only sends a request to the local bus, bus one. Next, arbiter one grants bus one to the master device (step 302). The grant of the bus by arbiter one to the master device is made with a grant signal. The master device then starts the transaction by placing the address of the destination or target device onto bus one (step 304). Decoder one on bus one decodes the address and selects the bridge (step 306). The decoder sees the address from the master device and recognizes that the target device is not on bus one. In accordance with a preferred embodiment of the present invention, decoder one selects the bridge. In the depicted example, the target is on bus two with the decoder selecting the bridge connecting bus one to bus two. If more than one bridge is connected to bus one, the decoder selects the correct bridge depending on where the target is located. The decoder selects the bridge based on the address placed onto the bus by the master device. In the depicted example, the target device is located on bus two. As a result, the bridge requests bus two from arbiter two (step 308). In other words, in step 308, the bridge sees the device selection from decoder one on bus one and generates a request to arbiter two on bus two. Arbiter two may use any type of arbitration scheme for its local bus, bus two. This arbitration scheme may be different from the one employed by arbiter one on bus one. For this transaction on the bus one side, the bridge acts as a target device on bus one, and for the transaction on the bus two side, the bridge acts as a master device on bus two.

At the same time as the bridge requests bus two, the bridge also may perform an address translation (step 310). This step is an optional step and is employed if bus one and bus two use different address maps. Also, concurrently with steps 308 and 310, the bridge waits the master device (step 312). From the time the bridge receives the device select signal from the decoder on bus one until the time the bridge connects bus one and bus two signals together, the bridge will cause the master device to wait. The process then proceeds when bus two is granted to the bridge (step 314). This grant occurs by the arbiter sending a grant signal to the bridge. Next, the bridge drives the address (or the translated address) onto bus two (step 316). Decoder two on bus two recognizes that the target device is located on bus two and issues a device select to the target device (step 318). At that time the bridge connects address, data, and control signals of bus one and bus two (step 320). This step occurs once the target device has been selected. The bridge connects the address, data, and control signals of bus one and bus two together so that the two buses will behave as one bus. The master device is no longer waited by the bridge and can now directly read and write data to the target device.

The master finishes the data transaction, removes the request for the bus, stops driving the address onto bus one, and performs other actions associated with the termination of the data transaction and the need for the bus. (step 322). In response, arbiter one removes its grant of the bus one to the master device by deasserting the grant signal to the master device (step 324) and decoder one, recognizing the end of the transaction, deselects the bridge by removing the device select to the bridge (step 326). In response to the bridge being deselected, the bridge removes its request for bus two and stops driving the address onto bus two and breaks all signal connection between bus one and bus two (step 328). As a result, arbiter two removes its grant of bus two to the bridge (step 330) and decoder two deselects the target device (step 332) with the process terminating thereafter.

In accordance with a preferred embodiment of the present invention, deadlock is avoided by the bridge being able to recognize when it is selected by decoders on each side of the bridge at the same time. When this situation occurs, a bridge will issue a retry to one of the selected masters on the bus and process the selection from the decoder on the other bus. Under this mechanism, the master that is told to retry its request, removes its request from the bus. In this manner, the bus is freed up for the transaction on the other bus until the transaction is complete, avoiding a deadlock. Depending on the priorities of the devices located in the data processing system, the bridge may alternate which side is issued a retry or always have one side issue a retry. This mechanism is described in more detail in FIG. 4 below.

Turning now to FIG. 4, a flowchart of a process employed by a bridge during arbitration for access to a bus is depicted in accordance with a preferred embodiment of the present invention. The process begins with the bridge in an idle state (step 400). In the idle state no transactions are crossing the bridge, and the two buses connected by the bridge are not connected to each other. A determination is made as to whether the bridge has been selected (step 402). This determination determines whether a decoder on one of the buses connected to the bridge has selected the bridge. If the bridge has not been selected, the bridge returns to the idle state in step 400. If the bridge has been selected, the bridge determines whether it has been selected only by a decoder on one bus also referred to as being selected from "one side" or by decoders from both buses, also referred to as being selected from "both sides" (step 404). If a select is detected from both sides, it means that master devices from both buses are attempting to cross the bridge at the same time. In such a situation, the bridge issues a retry signal to one side (step 406) with the process then returning to step 404. Basically, one of the master devices is to be stopped from crossing the bridge and told to try its transaction at a later time. The bridge signals the master device on one of the buses that the bridge is busy and to retry at a later time. From the master's point of view, the bridge is the target device that it has addressed and that the target device has just told the master device that the target device is busy. Depending on the bus structure and the particular implementation, the bridge may be programmed to alternate which side is issued the retry signal or to always issue one side a retry signal.

If only one side has selected the bridge, the bridge initiates a bus request to the target bus (step 408). In the depicted example, the bus containing the master device is the first bus or the "master bus" and the bus containing the target device is the second bus or the "target bus". At the same time, an optional address translation may be performed (step 410). The bridge performs this step if the two buses connected to the bridge are using different address maps. The bridge also waits the master at the same time (step 412). More specifically, the bridge signals the master on the first bus to wait. The purpose is to cause the master device to remain on the first bus without advancing the data transaction (i.e., do not increment the address). The wait signal issued to the master device is in effect telling the master device that the target device is slow.

From step 408, the bus monitors to determine whether a bus grant has been received (step 414). If a bus grant has been received, the address received from the master device is driven onto the target bus (step 418). If necessary, this address may be a translated address generated from step 410. At this time the bridge is acting like a master device on the target bus. The bridge is repeating the original master device's initiation of the transaction. This process is the reason that the bridge in step 412 waits the original master device. After driving the address onto the target bus, the bridge connects the two buses, the bus containing the master device and the bus containing the target device (step 420). In step 420, the bridge stops waiting the master device and makes the connection between the master and target buses. The bridge provides a direct connection between the target device and the master device with no latency in the data transfer between the two devices.

A determination is made as to whether the device select has been removed from the bridge (step 422). If the select has not been removed, the process returns to step 420. Otherwise, the bridge removes the request for the target bus and disconnects the master bus and the target bus from each other. The bridge then returns to the idle state in step 400 to monitor for another device select.

With reference again to step 414, if the bridge has not received a bus grant, a determination is made as to whether the bridge has received a device select from the target bus (step 426). If a device select has not been received, the process returns to step 414. Otherwise, the bridge issues a retry signal to one of the two master devices (step 428). Receiving a device select instead of a bus grant means that a master device from the target bus side has been grant the bus instead of the bridge. Such a select of the bridge also means that a master device on the second bus is trying to cross the bridge to initiate a data transfer. The bridge must decide which master device is to continue the data transfer. The bridge could determine that the original master device on bus one is to continue the transaction and issue the retry signal onto the second bus. Alternatively, the bridge may determine that the new requesting master device on bus two should continue the transaction and issue the retry signal onto the first bus.

Next, a determination is made as to whether only a single device select remains on the bridge (step 430). If two selects are still present, the process returns to step 428. Otherwise, a determination is made as to the master device selected for issuance of the retry signal was the original master device, the master device on the first bus (step 432). If the selected master for the retry signal is the original master device, the process removes the request from the second bus (step 434) and returns to steps 408, 410, and 412 as described above. In such a situation the first bridge sends a request to the first bus after removing its request from the second bus—the first bus becomes the "target bus" and the second bus becomes the "master bus". Otherwise, the process returns to step 414 as previously described.

The process followed by the bridge in FIG. 4 can be applied to a situation in which the target does not exist on the second bus, but on a third bus connected to the second bus by a second bridge. In such a situation, the bridge drives the address onto the second bus with the decoder on the second bus selecting the second bridge connecting the second bus to a third bus on which the target device is located. The first bridge does not know that the target is not on the second bus. This process can be extended to any number of buses to the bus on which the target device is located.

Turning now to FIG. 5, a flowchart of a process implemented in a decoder is depicted in accordance with a preferred embodiment of the present invention. The process begins by the decoder monitoring to determine whether an address is valid on the bus (step 500). If an address is not present on the bus, the process returns to step 500. When an address is valid, the address is decoded (step 502). Each device in the data processing system is associated with an address or a range of addresses. A determination is made as to whether the decoded address is for a device located on the local bus (step 504). If the address is for a device on the local bus, the decoder then selects that device (step 506). Otherwise, the decoder selects a bridge associated with the decoded address (508). This bridge may be connected to a bus containing the device that is to be accessed or to a bus connected to a second bridge that is connected to a bus containing the target device. After selecting a device or a bridge, the decoder determines whether the address is still valid on the local bus (step 510). If the address is still valid, the decoder continues to select the selected device (step 512). Otherwise, the decoder deselects the selected device (step 514).

Thus, the present invention provides an improved method and apparatus for arbitrating access to devices on remote buses while avoiding deadlock situations occurring from master devices on two side of a bridge simultaneously trying to cross the bridge to initiate a data transaction. The arbitration system of the present invention allows for multiple buses to be connected together. These buses may operate independently or they may operate together or a mixture of both. The arbitration system of the present invention resolves all possible deadlock situations. The advantage is provided by processes implemented within the bridge that allows the bridge to act like a master or a target device. The bridge resolves all deadlock situations. As a result, preplanning for deadlock conditions in the top level arbiter is not required. The deadlock is resolved by retracting one of the master devices so that only one master device selects a bridge. Additionally, decoders are designed to select a bridge when a decoded address on the local bus is for a device on a remote bus. When connecting a master device and a target device, no latency occurs in the data transaction after the bridge connects the buses together.

In addition, the distributed arbitration scheme of the present invention allows for different types of arbitration to be used on each bus. Also, different address schemes may be used on each bus with the bridge providing address translations when necessary. Also, the present invention allows for any number of target devices or master devices to be on a bus. A bus may contain all target devices or all master devices. Further, some devices may act as both target and master devices. Additionally, the present invention may support any number of buses. Crossing of multiple bridges from a master device to a target device in a single transaction is supported by the present invention.

The present invention may be applied to data processing systems on various levels from computers using PCI buses to data processing systems located on a chip using system on a chip buses, such as ASB buses.

It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include: recordable-type media such a floppy discs and CD-ROMs and transmission-type media such as digital and analog communications links.

The description of the present invention has been presented for purposes of illustration and description, but is not limited to be exhaustive or limited to the invention in the form disclosed. Many modifications and variations will be apparent to those of ordinary skill in the art. The embodiment was chosen and described in order to best explain the principles of the invention the practical application to enable others of ordinary skill in the art to understand the invention for various embodiments with various modifications as are suited to the particular use contemplated.

What is claimed is:

1. A method in a data processing system for facilitating a data transfer between a master device and a target device, wherein the data processing system includes a first bus connected to a second bus by a bridge the method comprising:

detecting a transfer request for a target device from a master device connected to the first bus;

determining whether the target device is connected to the second bus in response to receiving the transfer request;

selecting the bridge in response to determining that the target device is located on the second bus;

initiating a bus request for the second bus by the bridge in response to the selection of the bridge; and connecting the first bus and the second bus in response to the bridge receiving a grant to the second bus, wherein the master device transfers data between the master device and the target device.

2. The method of claim 1 further comprising:

issuing a signal to deselect the bridge in response to the bridge receiving a select form the second bus.

3. The method of claim 2, wherein the signal is issued onto the first bus to the master device on the first bus.

4. The method of claim 2, wherein the signal is issued onto the second bus.

5. The method of claim 1, wherein the transfer request includes an address of the target device.

6. The method of claim 5, wherein the step of determining whether the target device is connected to the second bus comprises decoding the address to determine whether the address is associated with a device located on the second bus.

7. A data processing system comprising:

a first bus;

a second bus;

a bridge connecting the first bus to the second bus;

a master device connected to the first bus;

a target device connected to the second bus;

detection means for detecting a transfer request for a target device from a master device connected to the first bus;

determination means for determining whether the target device is connected to the second bus in response to receiving the transfer request;

selection means for selecting the bridge in response to determining that the target device is located on the second bus;

initiation means for initiating a bus request for the second bus by the bridge in response to the selection of the bridge; and connection means for connecting the first bus and the second bus in response to the bridge receiving a grant to the second bus, wherein the master device transfers data between the master device and the target device.

8. The data processing system of claim 7 further comprising:

signal means for issuing a signal to deselect the bridge in response to the bridge receiving a select from the second bus.

9. The data processing system of claim 8, wherein the signal is issued onto the first bus to the master device on the first bus.

10. The data processing system of claim 8, wherein the signal is issued onto the second bus.

11. The data processing system of claim 7, wherein the transfer request includes an address of the target device.

12. The data processing system of claim 11, wherein the determination means comprises decoding means for decoding the address to determine whether the address is associated with a device located on the second bus.

13. The data processing system of claim 7, wherein the bridge connecting the first bus to the second bus is a first bridge, the master device connected to the first bus is a first master device, and the target device connected to the second bus is a first target device, the data processing system further comprising:

a third bus;

a second bridge, connecting the second bus to the third bus;

second detection means for detecting a second transfer request for a second target device from a second master device connected to the second bus;

second determination means for determining whether the second target device is connected to the third bus in response to receiving the second transfer request;

second selection means for selecting the second bridge in response to determining that the target device is located on the third bus;

second initiation means for initiating a request for the third bus by the second bridge in response to the selection of the second bridge; and second connection means for connecting the second bus and the third bus in response to the second bridge receiving a grant to the third bus, wherein the master device transfers data between the master device and the target device.

14. The data processing system of claim 13, wherein the second master device is the first bridge.

15. A bridge comprising:

an interface configured for connection to a first bus; and an interface configured for connection to a second bus;

wherein the bridge has a plurality of modes of operation including:

a first mode of operation, responsive to a selection of the bridge originating from the first bus, in which the bridge determines whether a selection also has occurred from the second bus;

a second mode of operation, responsive to a selection of the bridge from both the first bus and the second bus, in which the bridge issues a signal to deassert the selection from the second bus;

a third mode of operation, responsive to a selection of the bridge only from the first bus, in which the bridge issues a request for access to the second bus; and a fourth mode of operation, responsive to receiving a grant of the second bus, in which the bridge connects the first bus to the second bus.

16. The bridge of claim 15, wherein latency in data transfer from between bus one and bus two is absent after the first bus and second bus are connected to each other.

17. The bridge of claim 15 further comprising a fifth mode of operation, responsive to receiving a selection of the bridge from the second bus after requesting access to the second bus, in which the bridge issues a signal to deassert the selection from second bus.

18. The bridge of claim 15 further comprising a fifth mode of operation, responsive to receiving a selection of the bridge from the second bus after requesting access to the second bus, in which the bridge issues a signal to deassert the selection from first bus.

19. The bridge of claim 15, wherein the first bus is an advanced system bus.

20. The bridge of claim 15, wherein the first bus is a peripheral component interconnect bus.

21. A data processing system comprising:

a first bus a second bus;

a bridge connecting the first bus to the second bus;

a master device connected to the first bus;

a target device connected to the second bus; and a decoder connected to the first bus, wherein the decoder receives an address for a target device from the master device, determines whether the target device is connected to the second bus in response to receiving the address for the target device, and selects the bridge in response to determining that the target device is located on the second bus, wherein the bridge initiates a request for the second bus in response to the selection of the bridge, and connects the first bus and the second bus in response to the bridge receiving a grant to the second bus, wherein the master device transfers data between the master device and the target device.

22. The data processing system of claim 21, wherein the first bus and the second bus are advanced system buses.

23. The bridge of claim 21, wherein the first bus and second bus are a peripheral component interconnect bus.

24. The data processing system claim 22, wherein the data processing system is a system on a chip.

25. A method in a data processing system for facilitating a data transfer between a master device and a target device, wherein the data processing system includes a first bus connected to a second bus by a bridge the method comprising:

detecting a first request for a target device from a master device connected to the first bus;

determining whether the target device is connected to the second bus in response to receiving the request for the target device;

selecting the bridge in response to determining that the target device is located on the second bus;

determining if the bridge has been selected based on a second request from a device connected to the second bus at a same time as the first request; and selecting either the first request or the second request for completion based on a selection criteria.

26. The method of claim 25 further comprising:

initiating a request for the second bus by the bridge if the first request is selected for completion;

connecting the first bus and the second bus in response to the bridge receiving a grant to the second bus, wherein the master device transfers data between the master device and the target device; and issuing a signal to the master device to deselect the bridge if the second request is selected for completion.

27. The method of claim 25, wherein the selection criteria includes selecting a device having a highest priority.

28. The method of claim 25, wherein the selection criteria includes at least one of alternating between selecting devices on the first bus and the second bus and always selecting devices connected to one of the first bus and the second bus.

29. A data process system comprising:

a first bus;

a second bus;

a bridge connecting the first bus to the second bus;

a master device connected to the first bus;

a target device connected to the second bus;

detection means for decoding a first request for a target device from a master device connected to the first bus;

first determination means for determining whether the target device is connected to the second bus in response to receiving the first request for the target device;

first selection means for selecting the bridge in response to determining that the target device is located on the second bus;

second determination means for determining if the bridge has been selected based on a second request from a device connected to the second bus at a same time as the first request; and second selection means for selecting either the first request or the second request for completion based on a selection criteria.

30. The data processing system of claim 29 further comprising:

initiation means for initiating a request for the second bus by the bridge if the first request is selected for completion;

connection means for connecting the first bus and the second bus in response to the bridge receiving a grant to the second bus, wherein the master device transfers data between the master device and the target device; and signal means for issuing a signal to the master device to deselect the bridge if the second request is selected for completion.

31. The data processing system of claim 29, wherein the selection criteria includes selecting a device having a highest priority.

32. The data processing system of claim 29, wherein the selection criteria includes at least one of alternating between selecting devices on the first bus and the second bus and always selecting devices connected to one of the first bus and the second bus.

* * * * *